United States Patent
Lu

(10) Patent No.: US 10,691,515 B2
(45) Date of Patent: Jun. 23, 2020

(54) TESTING IN SERVERLESS SYSTEM WITH AUTOSTOP OF ENDLESS LOOP

(71) Applicant: INSTITUTE FOR INFORMATION INDUSTRY, Taipei (TW)

(72) Inventor: Shih-Yu Lu, Puli Township (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 412 days.

(21) Appl. No.: 15/834,448

(22) Filed: Dec. 7, 2017

(65) Prior Publication Data

US 2019/0155670 A1    May 23, 2019

(30) Foreign Application Priority Data

Nov. 23, 2017  (TW) .............................. 106140834 A

(51) Int. Cl.
G06F 11/00 (2006.01)
G06F 11/263 (2006.01)

(52) U.S. Cl.
CPC .......... G06F 11/004 (2013.01); G06F 11/263 (2013.01); G06F 2201/81 (2013.01)

(58) Field of Classification Search
CPC ... G06F 11/004; G06F 11/263; G06F 2201/81
See application file for complete search history.

(56) References Cited

U.S. PATENT DOCUMENTS

| 5,628,013 A * | 5/1997 | Anderson | G06F 9/4887 718/107 |
| 2002/0019843 A1* | 2/2002 | Killian | G06F 9/465 718/102 |

\* cited by examiner

Primary Examiner — Matthew M Kim
Assistant Examiner — Indranil Chowdhury
(74) Attorney, Agent, or Firm — Birch, Stewart, Kolasch & Birch, LLP

(57) ABSTRACT

The detecting method includes: obtaining a testing signal, perform at least one action according to the testing signal, and transmit a request instruction comprising the testing signal; determining that whether the testing signal of the request instruction represents performing a testing mode by a processor; if the processor determines that the testing signal of the request instruction represents performing the testing mode, the processor requests a testing service device to provide at least one service corresponding to the request instruction; collecting a performing order when the processor performing the at least one action and a performing result of each one of the at least one action, and combine the performing order and the performing result as a to-be classified data; and calculating a detecting result according to the to-be classified data, wherein the detecting result represents that whether a snow ball effect will occur.

12 Claims, 5 Drawing Sheets

TESTING IN SERVERLESS SYSTEM WITH AUTOSTOP OF ENDLESS LOOP

This application claims priority to Taiwan Application Serial Number 106140834, filed Nov. 23, 2017, which is herein incorporated by reference.

FIELD OF DISCLOSURE

The present disclosure relates to a detecting system and a detecting method. More particularly, the present disclosure relates to a detecting system and a detecting method suitable for serverless structure.

DESCRIPTION OF RELATED ART

Serverless structure can establish and execute the application and the service, without managing infrastructures. The application can still be executed on the server, and all the server manage task is operated by the serverless structure. Therefore, user does not need to configure, extend and maintain server to execute the application, database and storage system.

However, the feature of serverless structure and develop method easily causes the snow ball effect. And, it is not easy for the developer to test and debug on the cloud platform of the serverless structure.

Therefore, how to provide a serveless structure for the developer to test and debug and how to avoid the snow ball effect have become a problem for one of ordinary skill in the art to solve.

SUMMARY

One aspect of the present disclosure is related to a detecting system. The detecting system includes a processor. The processor contains a plurality of modules include a testing mode module, a service redirection module, a data collection module and a classification module. The testing mode module obtains a testing signal, performs at least one action according to the testing signal, and transmits a request instruction comprising the testing signal. The a service redirection module determines that whether the testing signal of the request instruction represents performing a testing mode. If service redirection module determines that the testing signal of the request instruction represents performing the testing mode, the service redirection module requests a testing service device to provide at least one service corresponding to the request instruction. The data collection module collects a performing order when the testing mode module performing the at least one action and a performing result of each one of the at least one action, and combine the performing order and the performing result as a to-be classified data. The classification module, comprising a classification model, configured to calculate a detecting result according to the to-be classified data, wherein the detecting result represents that whether a snow ball effect will occur. The modules are operated under the control of the processor.

Another one aspect of the present disclosure is related to a detecting method suitable for a serverless structure. The detecting method includes: obtaining a testing signal, perform at least one action according to the testing signal, and transmit a request instruction comprising the testing signal; determining that whether the testing signal of the request instruction represents performing a testing mode by a processor; if the processor determines that the testing signal of the request instruction represents performing the testing mode, the processor requests a testing service device to provide at least one service corresponding to the request instruction; collecting a performing order when the processor performing the at least one action and a performing result of each one of the at least one action, and combine the performing order and the performing result as a to-be classified data; and calculating a detecting result according to the to-be classified data, wherein the detecting result represents that whether a snow ball effect will occur.

Based on above, the present disclosure provides the service for automatically switching to the testing service device to the developer by the detecting system when the developer is testing the program. It can avoid that the testing program impacts the normal user's operation. Besides, the present disclosure applies the machine learning algorithm to determine that whether the snow ball effect will occur. And, the detecting system immediately stops executing the testing program when the snow ball effect will occur. It can avoid the damage of the serverless structure. Further, the developer debugs easily by collecting data during operating the testing program. Therefore, the detecting system and the detecting method achieve the effect that making the developer easily tests the program in the severless structure and avoiding the detecting system causing the snow ball effect.

BRIEF DESCRIPTION OF THE DRAWINGS

The disclosure can be more fully understood by reading the following detailed description of the embodiment, with reference made to the accompanying drawings as follows.

DETAILED DESCRIPTION OF DISCLOSED EMBODIMENTS

Figure 1:
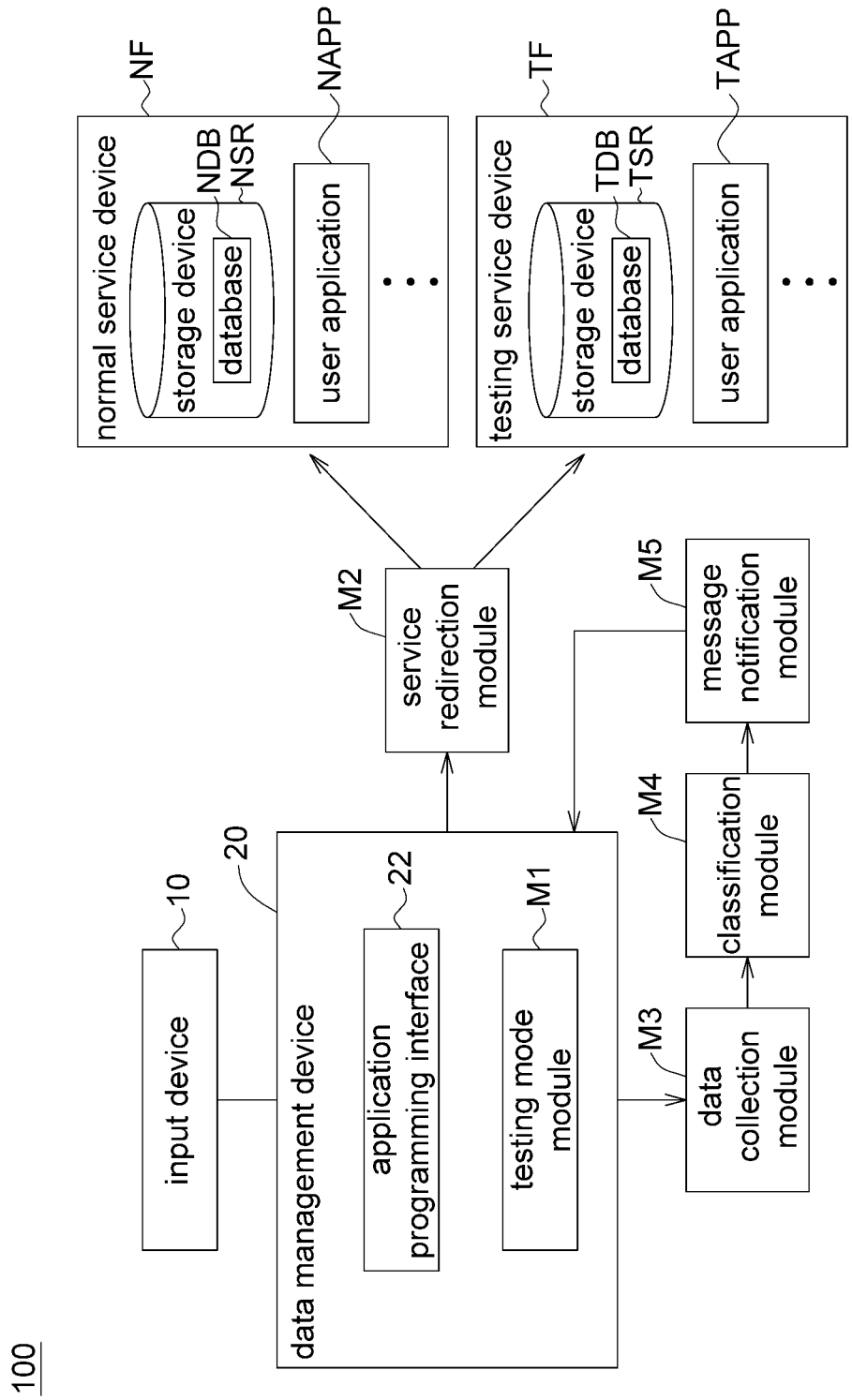
FIG. 1 is a schematic diagram of detecting system according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

Figure 2:
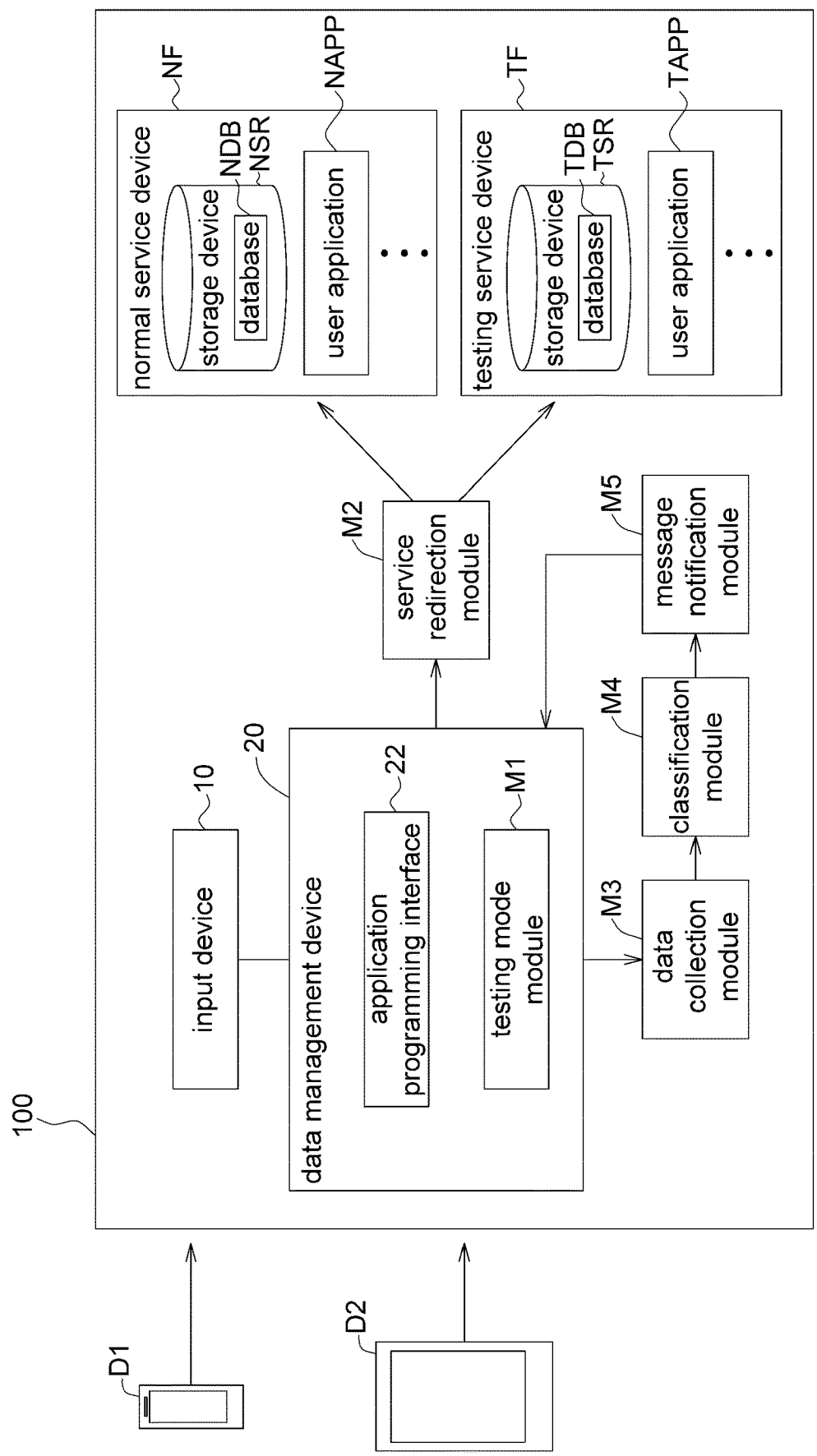
FIG. 2 is a schematic diagram of the interaction between the detecting system and the electronic devices according to one embodiment of the present disclosure.
Figure 3:
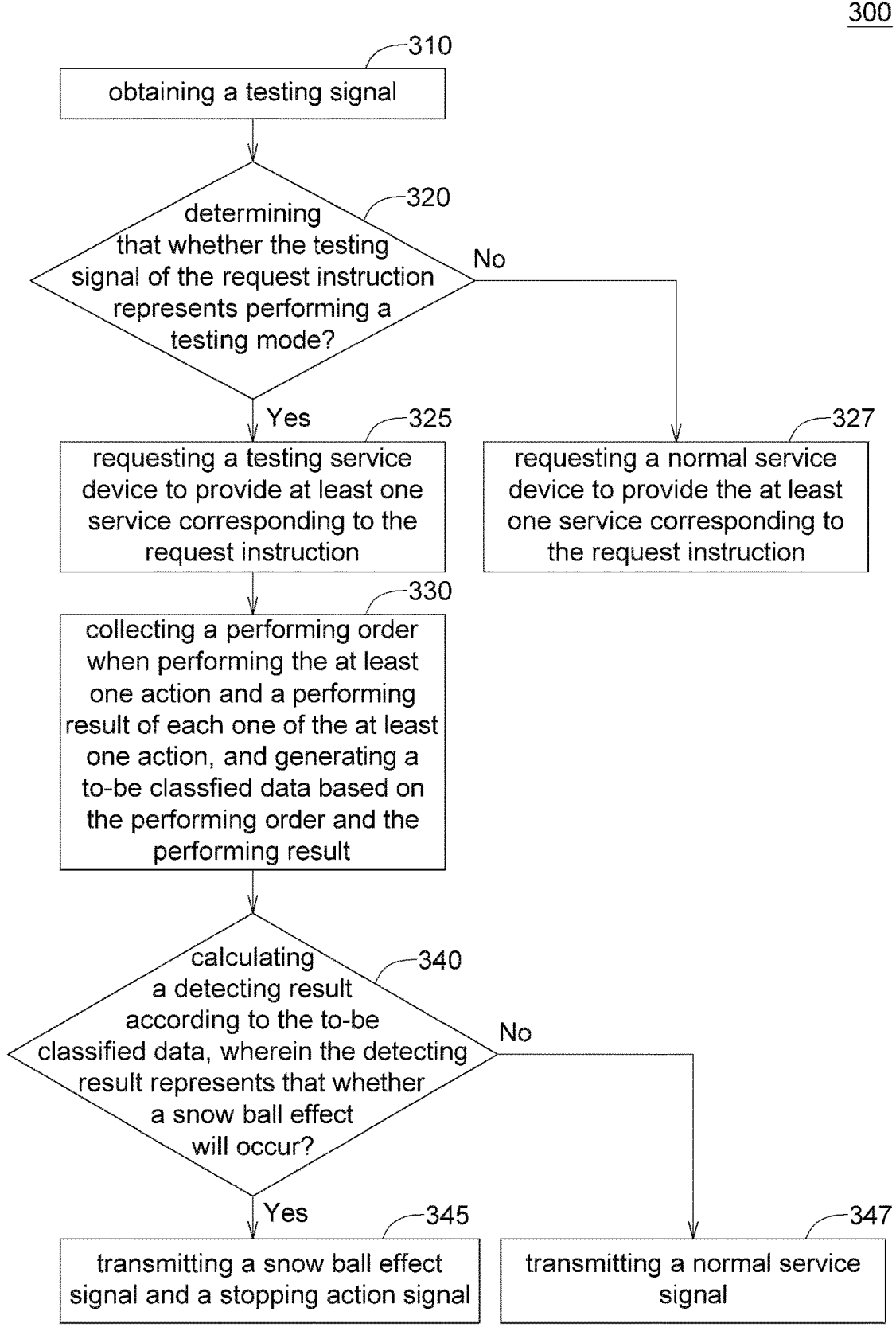
FIG. 3 is a flowchart diagram of the detecting method according to one embodiment of the present disclosure.

Reference is made to FIGS. 1-3. FIG. 1 is a schematic diagram of detecting system 100 according to one embodiment of the present disclosure. FIG. 2 is a schematic diagram of the interaction between the detecting system 100 and the electronic devices D1, D2 according to one embodiment of the present disclosure. FIG. 3 is a flowchart diagram of the detecting method 200 according to one embodiment of the present disclosure. In one embodiment, the detecting system 100 includes a testing mode module M1, a service redirection module M2, a data collection module M3 and a classification module M4. In one embodiment, the detecting system 100 further comprises a message notification module M5. In one embodiment, the detecting system 100 further comprises an input device 10, a normal service device NF and a testing service device TF. In one embodiment, a data management device 20 comprises an application programming interface 22 and a testing mode module M1. The normal service device NF comprises a database NDB of a storage device NSR and a user application NAPP. The testing service device TF comprises a database TDB of a storage device TSR and a user application TAPP.

In one embodiment, a user can input the instruction or program to the application programming interface 22 by the input device 10. The input device 10 and the application programming interface 22 can separately use the software or the hardware to implement, for example, the user interface, physical network interface or other electronic device with the function of receiving signal.

In one embodiment, the data management device 20 can be a server, a notebook, a desktop or any other electronic device with calculating function.

In one embodiment, the testing mode module M1, the service redirection module M2, the data collection module M3, the classification module M4 and the message notification module M5 can be implemented separately or along with the others by a microcontroller, a microprocessor, a digital signal processor, an application specific integrated circuit (ASIC), or a logic circuit.

In one embodiment, the storage device NSR and the storage device TSR can be implemented by memory, hard disk, memory card, or a storage medium having the same function, etc.

In one embodiment, the user application TAPP and the user application NAPP can be the application that user wants to execute. The normal service device NF uses for executing the user application NAPP. The testing service device TF uses for executing the user application TAPP.

In FIG. 2, detecting system 100 can receive the events of electronic device D1, D2. The electronic device D1, D2 can be, such as smart phone, panel, notebook, sensor or other devices with transmitting function. The events triggered by the electronic device D1, D2, for example, updating an image to the detecting system 100, can make the detecting system 100 detect that the data is updated. The detecting system 100 is triggered to perform the default application or the rule defined by user, such as creating thumbnail image, transcoding image, etc. And, the detecting system 100 performs an action, such as uploading the transcoded image to the other software or hardware device. The detail of detecting method 300 is described as follows.

In step 310, the testing mode module M1 obtains a testing signal, performs at least one action according to the testing signal, and transmits a request instruction comprising the testing signal.

In one embodiment, user can input the testing signal to the application programming interface 22 by the input device 10. The application programming interface 22 transmits the testing signal to the testing mode module M1.

Figure 4:
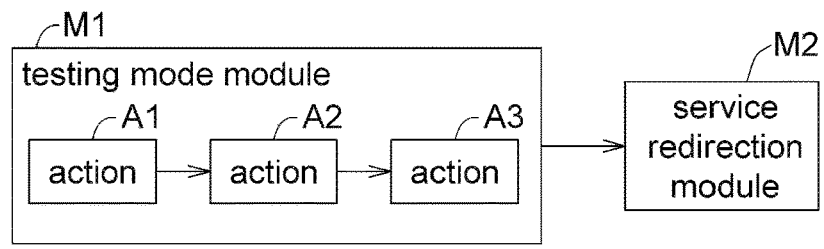
FIG. 4 is a schematic diagram of the testing mode module performing multiple actions according to one embodiment of the present disclosure.

Referring to FIG. 4, FIG. 4 is a schematic diagram of the testing mode module performing multiple actions A1-A3 according to one embodiment of the present disclosure. In one embodiment, the testing mode module M1 sequentially performing multiple actions A1-A3. The actions A1-A3 are edited by different programming languages. For example, action A1 is edited by "NodeJS" programming language. The testing mode module M1 performs the action A1 to generate a first performing result and substitutes the first performing result into the action A2. The action A2 is edited by "Python" programming language. The testing mode module M1 performing action A2 to generate a second performing result and substitutes the second performing result into the action A3. The action A3 substitutes the second performing result into a platform of "Docker" to operate for generating a third performing result. However, the programming languages can be operated by the testing mode module M1 is not limited herein. The testing mode module M1 can perform all the programming language which can be supported by the data management device 20.

In one embodiment, the testing mode module M1 transmits the request instruction comprising the testing signal to the service redirection module M2.

In step 320, the service redirection module M2 determines that whether the testing signal of the request instruction represents performing a testing mode. If service redirection module M2 determines that the testing signal of the request instruction represents performing the testing mode, the service redirection module M2 requests a testing service device TF to provide at least one service corresponding to the request instruction (step 325). In one embodiment, if the service redirection module M2 determines that the testing signal of the request instruction does not represent performing a testing mode, the service redirection module M2 requests a normal service device NF to provide the at least one service corresponding to the request instruction (step 327).

In one embodiment, service(s) can be a database system accessing service, a storage device configuration service or user application TAPP, NAPP. The corresponding service(s) can be called by the normal service device NF and/or the testing service device TF.

Figure 5:
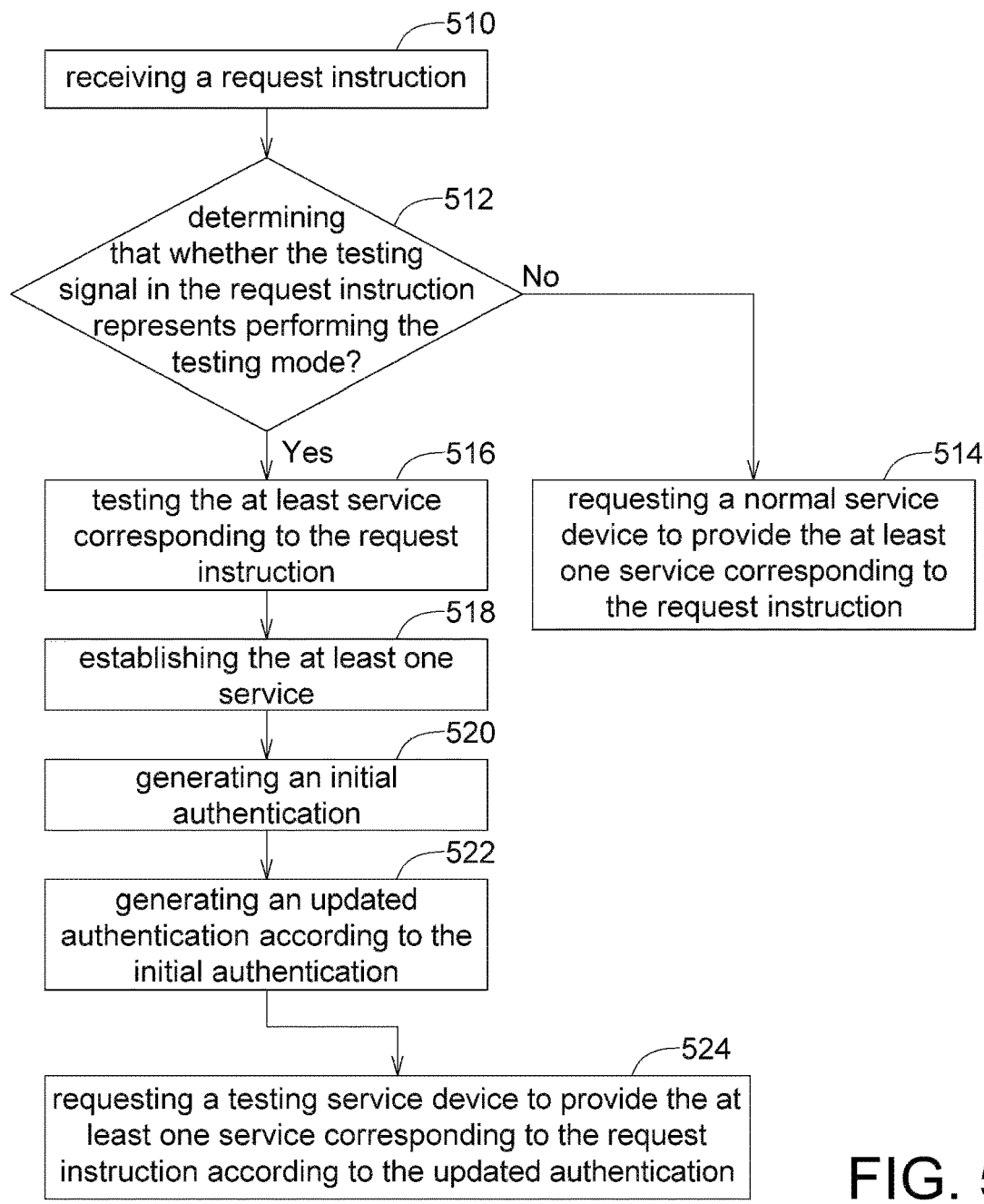
FIG. 5 is a flowchart diagram of the service redirection method according to one embodiment of the present disclosure.

Referring to FIG. 5, FIG. 5 is a flowchart diagram of the service redirection method 500 according to one embodiment of the present disclosure. The steps 510-524 in FIG. 5 can be the sub-steps of step 325. In FIG. 5, the service redirection module M2 receives a request instruction (step 510) and determines that whether the testing signal of the request instruction represents performing the testing mode (step 512). When the service redirection module M2 determines that the testing signal of the request instruction represents performing the testing mode, the service redirection module M2 tasks the at least service corresponding to the request instruction (step 516), such as checking the service of using database TDB according to the request instruction or the service related to the storage device TSR, to establish the at least one service (step 518) and list the service(s) related to perform the test, e.g., application(s), so as to make the service redirection module M2 rapidly finish the testing configuration in the detecting system 100 and dynamically establish the service(s) related to the testing. Next, the service redirection module M2 generates an initial authentication (step 520) for representing that the current user is certified to obtain the authentication for operating the detecting system 100. And, the service redirection module M2 generates an updated authentication according to the initial authentication (step 522). The updated authentication can use for changing the path direction to obtain the service (e.g., the storage device configuration service), without interrupting user's operation. And next, the service redirection module M2 requests a testing service device TF to provide the at least one service corresponding to the request instruction according to the updated authentication (step 524), so as to redirect the request instruction to the testing service device TF (e.g., the request instruction means writing new image file to the database TSR).

By service redirection method 500, when user test the program and need to access the service (or resource) of database TDB or storage device TSR, user does not need to know the IP address of database TDB or storage device TSR. User only needs to obtain the initial authentication, and the detecting system will automatically generate a updated authentication. By the updated authentication, the service redirection module M2 automatically redirects the path to the testing service device TF (the step is automatically operated by the service redirection module M2, without configuring by user) for obtaining the services of the requirement of accessing database TDB or storage TSR in testing service device TF.

The testing service device TF will not impact other user's normal operation when testing the program due to the testing service device TF and the normal service device NF are the two independent conditions. For example, as shown in FIG. 1, in normal operation, the service redirection module M2 directs the request instruction to the normal service device NF to obtain the service.

In step 514, if the service redirection module M2 determines that the testing signal of the request instruction does not represent performing a testing mode, the service redirection module M2 requests a normal service device NF to provide the at least one service corresponding to the request instruction, so as to direct the request instruction to the normal service device NF.

Referring to FIG. 3 again, in step 330, the data collection module M3 collects a performing order when the testing mode module M1 performs the at least one action A1-A3 and a performing result (e.g., the first performing result to the third performing result) of each one of the at least one action A1-A3, and generates a to-be classified data based on the performing order and the performing result as a to-be classified data.

Figure 6:
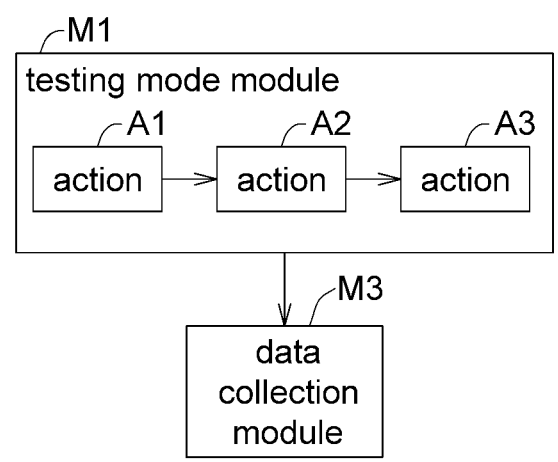
FIG. 6 is a flowchart diagram of the data collection method according to one embodiment of the present disclosure.

Referring to FIG. 6, FIG. 6 is a flowchart diagram of the data collection method according to one embodiment of the present disclosure. In FIG. 6, the data collection module M3 collects a performing order when the testing mode module M1 performs the at least one action A1-A3 and a performing result (e.g., the first performing result to the third performing result) of each one of the at least one action A1-A3. The data collection module M3 combines the performing order and the performing result as a to-be classified data. The form of the to-be classified data can be, for example, a log file. In one embodiment, the performing order is action A1, action A2 and action A3 in sequence.

The step 330 and the step 325 can be executed in the same time, or exchange the execution order.

In step 340, classification module M4 comprises a classification model for calculating a detecting result according to the to-be classified data. The detecting result represents that whether a snow ball effect will occur.

In one embodiment, if the detecting result represents that the snow ball effect will occur, step 345 is performed. If the detecting result represents that the snow ball effect will not occur, step 347 is performed.

In one embodiment, the classification module M4 substitutes multiple known data to a machine learning algorithm to generate the classification model in a training stage. And, the classification module M4 substitutes the to-be classified data to the classification model in a prediction stage to determine whether a snow ball effect will occur, so as to generate the detecting result.

In one embodiment, the classified model can be implemented by one or more function. For example, the classified model can be implemented by the known S function (e.g., sigmoid function) and the function to highlight the maximum value (e.g., softmax function). The step can be implemented by known machine learning algorithm. As such, it is no more further description herein.

In one embodiment, the snow ball effect indicates that an event is glowing bigger and bigger like a rolling snow ball, so as to describe the scale of the event increases rapidly. In present disclosure, the snow ball effect represents that a storage device adopted by the at least one service is the same as the storage device in an electronic device, and the electronic device transmits the testing signal. For example, when the storage device adopted by at least one service for writing new image file (e.g., the storage device of electronic device D1) in step 320 is the same as the storage device in the electronic device for transmitting the testing signal (e.g., also the storage device of electronic device D1), the detecting system 100 detects that the file in the storage device of electronic device D1 is modified. Therefore, the detecting system 100 is triggered again by the electronic device D1, and the step 310 is performed again. It may cause an endless loop like creating a snow ball effect.

In step 345, the message notification module M5 transmits a snow ball effect signal and a stopping action signal.

In one embodiment, the message notification module M5 transmits a snow ball effect signal to the electronic device (e.g., electronic device D1) which transmitting the testing signal.

In step 347, the message notification module M5 transmits a normal service signal. In one embodiment, the message notification module M5 transmits a normal service signal to the electronic device (e.g., electronic device D1) which transmitting the testing signal.

Based on above, the present disclosure provides the service for automatically switching to the testing service device to the developer by the detecting system when the developer is testing the program. It can avoid that the testing program impacts the normal user's operation. Besides, the present disclosure applies the machine learning algorithm to determine that whether the snow ball effect will occur. And, the detecting system immediately stops executing the testing program when the snow ball effect will occur. It can avoid the damage of the serverless structure. Further, the developer debugs easily by collecting data during operating the testing program. Therefore, the detecting system and the detecting method achieve the effect that making the developer easily tests the program in the severless structure and avoiding the detecting system causing the snow ball effect.

Although the present disclosure has been described in considerable detail with reference to certain embodiments thereof, other embodiments are possible. Therefore, the scope of the appended claims should not be limited to the description of the embodiments contained herein.

What is claimed is:

1. A detecting system suitable for a serverless structure, comprising:
    a processor containing a plurality of modules, including:
        a testing mode module configured to obtain a testing signal, perform at least one action according to the testing signal, and transmit a request instruction comprising the testing signal;

a service redirection module configured to determine whether the testing signal of the request instruction represents performing a testing mode, if service redirection module determines that the testing signal of the request instruction represents performing the testing mode, the service redirection module requests a testing service device to provide at least one service corresponding to the request instruction;

a data collection module configured to collect a performing order when the testing mode module performing the at least one action and a performing result of each one of the at least one action, and generate a to-be classified data based on the performing order and the performing result; and a classification module, comprising a classification model, configured to calculate a detecting result according to the to-be classified data, wherein the detecting result represents whether a snow ball effect will occur, wherein the snow ball effect represents that a storage device adopted by the at least one service is the same as the storage device in an electronic device, and the electronic device transmits the testing signal;

wherein the modules are operated under the control of the processor.

2. The detecting system of claim 1, further comprising:
a message notification module transmits a stopping action signal when the detection result represents that the snow ball effect will occur, the message notification module, transmits a normal service signal when the detection result represents that the snow ball effect will not occur.

3. The detecting system of claim 1, wherein the testing mode module sequentially performs a plurality of actions, the actions are edited by different programming languages.

4. The detecting system of claim 1, wherein if the service redirection module determines that the testing signal of the request instruction does not represent performing a testing mode, the service redirection module requests a normal service device to provide the at least one service corresponding to the request instruction.

5. The detecting system of claim 1, wherein when the service redirection module determines that the testing signal of the request instruction represents performing the testing mode, the service redirection module tests the at least one service, corresponding to the request instruction, to establish the at least one service and generate an initial authentication, generates an updated authentication according to the initial authentication, and requests the testing service device to provide the at least one service corresponding to the request instruction according to the updated authentication.

6. The detecting system of claim 1, wherein the at least one service means that a database system accessing service or a storage device configuration service.

7. A detecting method suitable for a serverless structure, comprising:
obtaining a testing signal, perform at least one action according to the testing signal, and transmit a request instruction comprising the testing signal;

determining whether the testing signal of the request instruction represents performing a testing mode by a processor;

if the processor determines that the testing signal of the request instruction represents performing the testing mode, the processor requests a testing service device to provide at least one service corresponding to the request instruction;

collecting a performing order when the processor performing the at least one action and a performing result of each one of the at least one action, and generating a to-be classified data based on the performing order and the performing result; and calculating a detecting result according to the to-be classified data, wherein the detecting result represents whether a snow ball effect will occur, wherein the snow ball effect represents that a storage device adopted by the at least one service is the same as the storage device in an electronic device, and the electronic device transmits the testing signal.

8. The detecting method of claim 7, further comprising:
transmitting a stopping action signal when the detection result represents that the snow ball effect will occur, transmitting a normal service signal when the detection result represents that the snow ball effect will not occur.

9. The detecting method of claim 7, wherein the processor sequentially performs a plurality of actions, the actions are edited by different programming languages.

10. The detecting method of claim 7, wherein if the processor determines that the testing signal of the request instruction does not represent performing a testing mode, the processor requests a normal service device to provide the at least one service corresponding to the request instruction.

11. The detecting method of claim 7, wherein when the processor determines that the testing signal of the request instruction represents performing the testing mode, the processor tests the at least one service corresponding to the request instruction to establish the at least one service and generate an initial authentication, generates an updated authentication according to the initial authentication, and requests the testing service device to provide the at least one service corresponding to the request instruction according to the updated authentication.

12. The detecting method of claim 7, wherein the at least one service means that a database method accessing service or a storage device configuration service.

* * * * *